(12) United States Patent
Mei et al.

(10) Patent No.: US 12,366,773 B2
(45) Date of Patent: Jul. 22, 2025

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventors: Xindong Mei, Hubei (CN); Shaojun Hou, Hubei (CN); Chao Wang, Hubei (CN); Guanghui Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 370 days.

(21) Appl. No.: 16/495,214

(22) PCT Filed: May 13, 2019

(86) PCT No.: PCT/CN2019/086528
§ 371 (c)(1),
(2) Date: Sep. 18, 2019

(87) PCT Pub. No.: WO2020/191877
PCT Pub. Date: Oct. 1, 2020

(65) Prior Publication Data
US 2021/0333633 A1 Oct. 28, 2021

(30) Foreign Application Priority Data
Mar. 27, 2019 (CN) .......................... 201910239505.6

(51) Int. Cl.
*G02F 1/13357* (2006.01)
*G03B 15/02* (2021.01)

(52) U.S. Cl.
CPC ....... *G02F 1/133603* (2013.01); *G03B 15/02* (2013.01)

(58) Field of Classification Search
CPC ............. G02F 1/133603; G02F 1/1336; G02F 1/13312; G02F 1/133615; G03B 15/02;
(Continued)

(56) References Cited

U.S. PATENT DOCUMENTS

| | | | |
|---|---|---|---|
| 11,422,298 B2 * | 8/2022 | Ota | H04M 1/0264 |
| 2018/0091729 A1 * | 3/2018 | Hanover | G06F 3/0346 |

(Continued)

FOREIGN PATENT DOCUMENTS

| | | |
|---|---|---|
| CN | 203038159 U | 7/2013 |
| CN | 106850897 A | 6/2017 |

(Continued)

OTHER PUBLICATIONS

Zhang, Machine Translation of CN208384291, Jan. 15, 2019 (Year: 2019).*

(Continued)

*Primary Examiner* — Kelly L Jerabek

(57) ABSTRACT

A backlight module and a display device are provided, which include a camera area and a backlight area, wherein the backlight area surrounds the camera area, the camera area includes a transparent illumination area and a non-transparent illumination area, and the non-transparent illumination area surrounds the transparent illumination area; and the light board is disposed in the non-transparent illumination area and the at least one light bead is disposed on a light board. In the display mode, the camera area obtains a uniform light source, so as to realize the camera area of the display device which can be displayed normally in the displaying mode, and achieve a true 100% screen ratio. In a lighting mode of the camera module, the light (Continued)

source of the light bead is turned off to avoid affecting the collecting operation of the camera module.

13 Claims, 2 Drawing Sheets

(58) Field of Classification Search
CPC . G02B 6/0011; H04M 1/0266; H04M 1/0264; H04N 23/00; H04N 23/56
See application file for complete search history.

(56) References Cited

U.S. PATENT DOCUMENTS

| | | | | |
|---|---|---|---|---|
| 2020/0192142 | A1* | 6/2020 | Kim | G02F 1/133528 |
| 2020/0292882 | A1* | 9/2020 | Nakamura | G02F 1/136286 |
| 2021/0109398 | A1* | 4/2021 | Son | G02F 1/13312 |

FOREIGN PATENT DOCUMENTS

| | | | |
|---|---|---|---|
| CN | 107248374 | A | 10/2017 |
| CN | 107784989 | A | 3/2018 |
| CN | 108267895 | A | 7/2018 |
| CN | 108810199 | A | 11/2018 |
| CN | 108897165 | A | 11/2018 |
| CN | 108900674 | A | 11/2018 |
| CN | 108900676 | A | 11/2018 |
| CN | 208384291 | U | 1/2019 |
| CN | 208386631 | U | 1/2019 |
| CN | 109379465 | A | 2/2019 |
| CN | 208609032 | U | 3/2019 |
| CN | 109901327 | A | 6/2019 |
| CN | 109976061 | A | 7/2019 |
| CN | 110007501 | A | 7/2019 |
| CN | 110187559 | A | 8/2019 |
| CN | 110231735 | A | 9/2019 |
| CN | 110471211 | A | 11/2019 |
| CN | 110646984 | A | 1/2020 |
| CN | 110879496 | A | 3/2020 |
| CN | 210605285 | U | 5/2020 |
| CN | 210894924 | U | 6/2020 |
| KR | 20090089623 | A | 8/2009 |
| KR | 20120118205 | A | 10/2012 |

OTHER PUBLICATIONS

Chinese Office Action issued in corresponding Chinese Patent Application No. 201911017511.3 dated Jul. 23, 2024, pp. 1-10.
International Search Report in International application No. PCT/CN2020/077687, mailed on Jun. 5, 2020.
Written Opinion of the International Search Authority in International application No. PCT/CN2020/077687, mailed on Jun. 5, 2020.

* cited by examiner

BACKLIGHT MODULE AND DISPLAY DEVICE

FIELD OF INVENTION

The present invention relates to a field of display technologies, and in particular to a backlight module and a display device.

BACKGROUND OF INVENTION

With the innovation and development of display technology, high screen ratio displays have become mainstream trends in the application of next-generation terminal devices. Due to the lighting requirements of some functional devices such as cameras and light sensors in the terminal device, the screen ratio of the display is difficult to increase, and the transparent display device that combines lighting and display has become an optimal choice for this demand. However, the transparent display device been applied in terminal device, which cannot use the conventional backlight and external light as the light source in the displaying mode.

Therefore, it is necessary to propose a new backlight module and display device to raise the screen ratio of the display device, and solve the problem that the transparent display device in the current technologies cannot use the conventional backlight and external light as the light source in the displaying mode.

SUMMARY OF INVENTION

Technical Problem

One of the objects of the present invention is to provide a backlight module which is divided into a camera area and a backlight area, and further divides the camera area into a transparent illumination area and a non-transparent illumination area, and by turning on or off the light source of the non-transparent illumination area to control the light of the transparent illumination area, thereby enabling the backlight module to provide different backlighting schemes.

Another object of the present invention is to provide a display device that uses a backlight module capable of providing different backlighting schemes, and the display panel can truly realize full-screen display when the camera module is not in operation.

Technical Solution

Further, a backlight module is an edge-light type backlight module, or a backlight module is a direct-light type backlight module.

The present invention further provides a display device, which includes a backlight module, a camera module, and a display panel. The camera module is disposed in the through hole and corresponds to the camera area, and the display panel is disposed above the backlight module.

Further, a display panel includes a display area and a transparent area, the display area corresponds to the backlight area of the backlight module and the non-transparent illumination area, and the transparent area corresponds to the transparent illumination area of the camera area of the backlight module; when the at least one light bead of the backlight module is turned on, the camera module is not in operation, the display area and the transparent area of the display panel normally display an image, and a full-screen display state is entered; and when the camera module is in operation, the at least one light bead is turned off, and the display panel corresponding to the backlight area is normally displayed.

Further, a display panel is a liquid crystal display panel, and a backlight area of the backlight module is configured to provide a light source for the display panel.

Further, a display panel is an organic light-emitting diodes (OLED) display panel, and the backlight area of the backlight module is turned off.

Beneficial Effect

The present invention provides a backlight module and a display device. By designing a current backlight module that a through hole is penetrated in a backlight module area corresponding to the camera module, and then a light board and at least one light bead are disposed around the camera module. And a camera module is disposed under the camera area to form a complete display device. When the at least one light bead of the backlight module is turned on, the camera module is not in operation, the display area and the transparent area of the display panel normally display an image, and a full-screen display state is entered to achieve a true 100% screen ratio. When the camera module is in operation, the at least one light bead is turned off, and the display panel corresponding to the backlight area is normally displayed.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present invention, and based on these drawings, a person skilled in the art may obtain the other drawings without any creative effort.

DETAILED DESCRIPTION OF EMBODIMENTS

Figure 1:
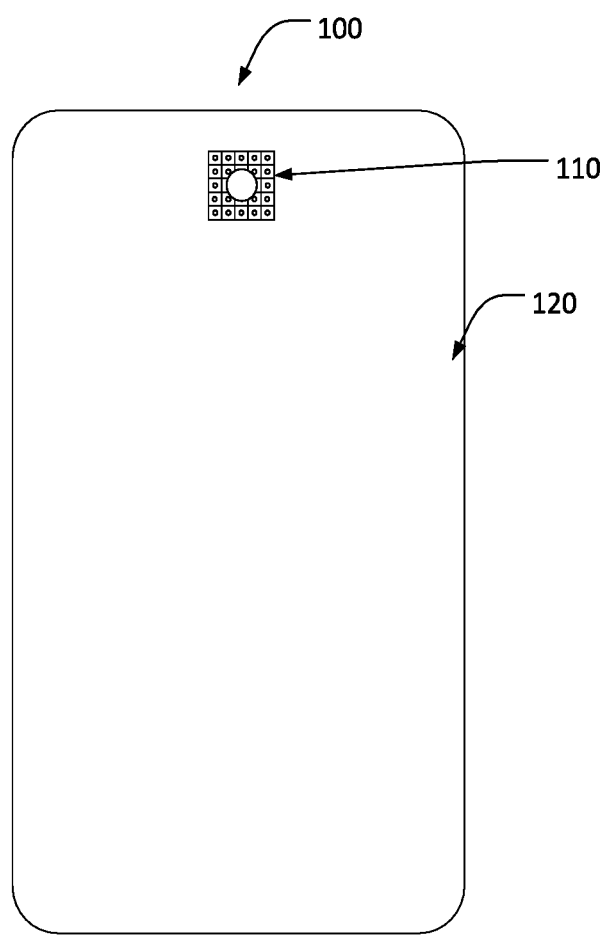
FIG. 1 is a top view of a backlight module provided by the present invention.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. The terms mentioned in the present invention, such as the first, second, and etc., are used for only distinguishing between different components and can be better expressed. In the drawings, components having similar structures are denoted by the same numerals.

Embodiments of the present invention will be described in detail herein with reference to the drawings. The present invention can be embodied in many different forms and the invention is not to be construed as being limited to the specific embodiments set forth herein. The embodiments of the present invention are provided to explain the practical application of the present invention so that any alterations and further modifications in the described embodiments, and any further applications of the principles of the invention as described herein are contemplated as would normally occur to one skilled in the art to which the invention relates.

As shown in FIG. 1, the present invention provides a backlight module 100, which includes a camera area 110 and a backlight area 120. The backlight area 120 surrounds the camera area 110.

Figure 2:
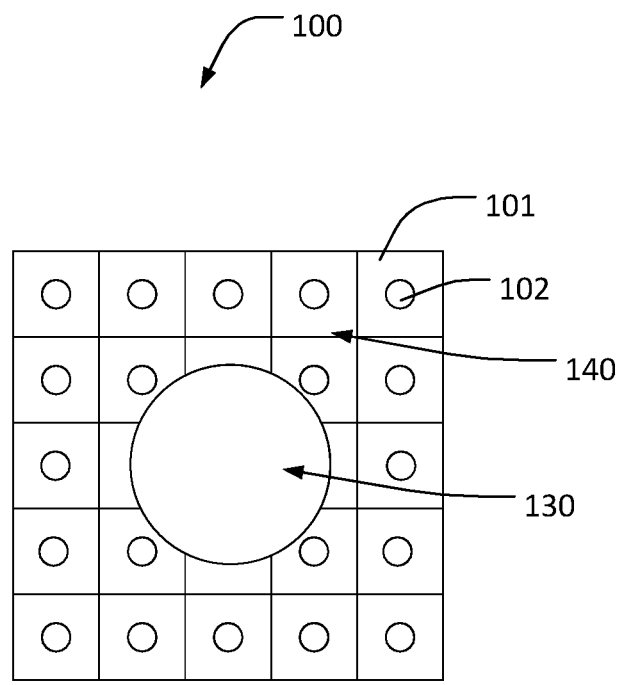
FIG. 2 is a partial schematic structural diagram of a backlight module provided by the present invention.

As shown in FIG. 2, the camera area 110 includes a transparent illumination area 130 and a non-transparent illumination area 140 surrounding the transparent illumination area 130.

The backlight module 100 includes a back frame, a backlight, a reflective sheet, a light guide plate, an optical film, a prism sheet, and a plastic frame (for the current technologies, not labeled in the drawings).

The backlight is disposed in the back frame. The light source is an edge-light type light source or a direct-light type light source, and the invention is preferably an edge-light type light source.

The reflective sheet is disposed in the back frame, the light guide plate is disposed on the reflective sheet, the optical film is disposed on a side of the light guide plate away from the reflective sheet, and the prism sheet is disposed on a side of the optical film away from the light guide plate.

The combination of the reflective sheet, the light guide plate, and the prism sheet is mainly for diffusing light of the backlight to the display panel 201 for improving the brightness of the display panel 201.

The plastic frame is disposed on the back frame.

Figure 3:
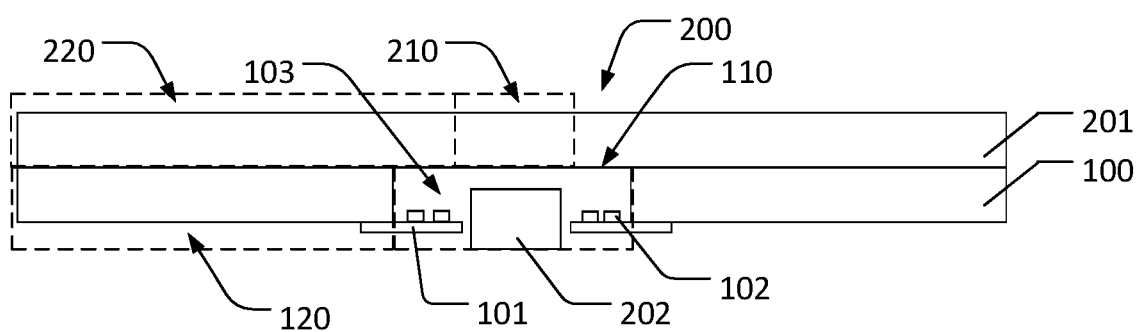
FIG. 3 is a schematic structural diagram of a display device provided by the present invention.

As shown in FIG. 3, the camera area 110 is a through hole 103, and the through hole 103 penetrates the backlight module 100, and the through hole 103 is a square shape. The dotted line frame in FIG. 3 represents the vertical planar area of the backlight module 100.

A light board 101 is disposed in the non-transparent illumination area and the at least one light bead 102 is disposed on the light board 101. The light bead 102 is a mini light emitting diode (LED) light bead.

The at least one light bead 102 disposed on the light board 101 is distributed in an array, and the at least one light bead 102 is distributed around the transparent illumination area 130.

The light board 101 is a circular or square shape, and the transparent illumination area 130 is a circular shape.

The direction of emitting light of the Mini LED in the non-transparent illumination area is adjustable, preferably ensuring that the transparent illumination area 130 obtains a uniform light source to achieve normal display of the transparent illumination area in the displaying mode.

When the camera area 110 is used for lighting, the Mini LED light source is turned off to avoid affecting the collecting operation of the camera module 202.

As shown in FIG. 3, another object of the present invention is to provide a display device 200, including the backlight module 100, a camera module 202, and a display panel 201. The camera module 202 is disposed in the through hole 103 and corresponds to the camera area 110. The dotted line frame in FIG. 3 represents the vertical planar area of the display device 200.

The display panel 201 is disposed above the backlight module 100, and the display panel 201 is an OLED (organic light-emitting diodes) flexible display panel 201. The backlight module 100 can provide sufficient brightness to the display panel 201, so that the display panel 201 can be displayed.

The backlight module 100 includes a camera area 110 and a backlight area 120. The backlight area 120 surrounds the camera area 110, the camera area 110 includes a transparent illumination area 130 and a non-transparent illumination area 140, and the non-transparent illumination area 140 surrounds the transparent illumination area 130.

The camera area 110 is a through hole 103, the through hole 103 penetrates through the backlight module 100, and the through hole 103 is a square shape. A light board 101 is disposed in the non-transparent illumination area, and at least one light bead 102 is disposed on the light board 101, and the light bead 102 is a Mini LED light bead. The light beads 102 are arranged in an array on the light board 101, and the light beads 102 are distributed around the transparent illumination area 130.

The display panel 201 includes a display area 220 and a transparent area 210. The dotted line frame on the display panel 201 shown in FIG. 3 is used to define the approximate range of the display area 220 and the transparent area 210. The display area 220 corresponds to the backlight area 120 of the backlight module 100 and the non-transparent illumination area 140, and the transparent area 210 corresponds to the transparent illumination area 130 of the camera area 110 of the backlight module 100.

When the light bead 102 of the backlight module 100 is turned on, the camera module 202 is not in operation, the display area 220 and the transparent area 210 of the display panel 200 can display an image normally, whereby a full-screen display state is entered.

The display panel 200 of the present invention can be a liquid crystal display panel or an OLED display panel.

If the display panel 200 is a liquid crystal display panel, and the backlight area 120 of the backlight module 100 is configured to provide a light source for the display panel 200.

If the display panel 200 is an OLED display panel, since the OLED display panel can self-illuminate, the backlight area 120 of the backlight module 100 does not need to provide a backlight, so it is turned off.

The present invention provides a backlight module and a display device, a through hole is penetrated in an area of the backlight module 100 corresponding to the camera module 202, and then a light board 101 and at least one light bead 102 are disposed around the camera module 202. And a camera module 202 is disposed under the camera area 110 to form a complete display device 200. In the display mode, the camera area 110 obtains a uniform light source, so as to realize the camera area of the display device 200 which can be displayed normally in the displaying mode, and achieve a true 100% screen ratio. In a lighting mode of the camera module 202, the light source of the light bead 102 is turned off to avoid affecting the collecting operation of the camera module 202.

The technical scope of the present invention is not limited to the above description, a person skilled in the art can make various modifications and changes to the above embodiments without departing from the technical idea of the present invention, and such variations and modifications are intended to be within the scope of the invention.

What is claimed is:

1. A backlight module, comprising:
a camera area;
a backlight area, wherein the backlight area surrounds the camera area, the camera area comprises a transparent illumination area and a non-transparent illumination area, and the non-transparent illumination area surrounds the transparent illumination area;

a light board; and at least one light bead;

wherein the camera area is a through hole penetrating through the backlight module;

wherein the light board is connected to the backlight area and extends to the non-transparent illumination area, and the at least one light bead is disposed on the light board and is entirely inside the through hole.

2. The backlight module according to claim 1, wherein the at least one light bead disposed on the light board is distributed in an array, and the at least one light bead is distributed around the transparent illumination area.

3. The backlight module according to claim 1, wherein the at least one light bead is at least one mini light emitting diode (LED) light bead.

4. The backlight module according to claim 1, wherein the light board is a circular or square shape, and the transparent illumination area is a circular shape.

5. The backlight module according to claim 1, wherein the backlight module is an edge-light type backlight module, or the backlight module is a direct-light type backlight module.

6. A display device, comprising the backlight module according to any one of claim 1;

wherein the display device further comprises a camera module and a display panel, the camera module is disposed in the through hole and corresponds to the camera area, and the display panel is disposed above the backlight module.

7. The display device according to claim 6, wherein the display panel comprises a display area and a transparent area, the display area corresponds to the backlight area of the backlight module and the non-transparent illumination area, and the transparent area corresponds to the transparent illumination area of the camera area of the backlight module;

when the at least one light bead of the backlight module is turned on, the camera module is not in operation, the display area and the transparent area of the display panel normally display an image, and a full-screen display state is entered; and when the camera module is in operation, the at least one light bead is turned off, and the display panel corresponding to the backlight area is normally displayed.

8. The display device according to claim 6, wherein the display panel is a liquid crystal display panel, and the backlight area of the backlight module is configured to provide a light source for the display panel.

9. The display device according to claim 6, wherein the display panel is an organic light-emitting diodes (OLED) display panel, and the backlight area of the backlight module is turned off.

10. The display device according to claim 6, wherein the at least one light bead disposed on the light board is distributed in an array, and the at least one light bead is distributed around the transparent illumination area.

11. The display device according to claim 6, wherein the at least one light bead is at least one mini light emitting diode (LED) light bead.

12. The display device according to claim 6, wherein the light board is a circular or square shape, and the transparent illumination area is a circular shape.

13. The display device according to claim 6, wherein the backlight module is an edge-light type backlight module, or the backlight module is a direct-light type backlight module.

* * * * *